United States Patent [19]

Terpstra et al.

[11] Patent Number: 4,888,540

[45] Date of Patent: Dec. 19, 1989

[54] ELECTRONIC TORQUER INTERFACE AND ERECTION CONTROL CIRCUIT

[75] Inventors: Larry J. Terpstra, Central Lake; William R. Babel, Charlevoix, both of Mich.

[73] Assignee: Allied-Signal Inc., Morris County, Morris Township, N.J.

[21] Appl. No.: 60,283

[22] Filed: Aug. 10, 1987

[51] Int. Cl.$^4$ ............................................. G05B 17/00
[52] U.S. Cl. ..................................... 318/689; 318/687; 318/649; 33/366
[58] Field of Search ....................... 318/689, 687, 649; 33/366

[56] References Cited

U.S. PATENT DOCUMENTS

| | | | |
|---|---|---|---|
| 3,979,090 | 9/1976 | Brickner et al. | 318/649 X |
| 4,189,946 | 2/1980 | Hoffman et al. | 74/5.4 |
| 4,503,622 | 3/1985 | Swartz et al. | 33/366 |
| 4,531,300 | 7/1985 | Heinel et al. | 33/366 |
| 4,547,972 | 10/1985 | Heinel et al. | 33/366 |

OTHER PUBLICATIONS

Zahid Rahim, "LVDT Interface Chip's Functional Blocks Offer Versatility", EDN, May 29, 1986, pp. 159–166.

Primary Examiner—William M. Shoop, Jr.
Assistant Examiner—Saul M. Bergmann
Attorney, Agent, or Firm—Howard G. Massung

[57] ABSTRACT

A gyroscope erection system uses an electrolytic tilt transducer (21) to modulate oscillator signals (OSC, $\overline{OSC}$) originating from a signal conditioning circuit (27). The signal conditioning circuit (27) receives the modulated oscillator signal and compares one unmodated oscillator signal with the modulated oscillator signal from the tilt transducer (21), to provide a demodulated signal. The demodulated signal is used to provide direction and amplitude signals to a pair of multipliers (45, 47). Output from the multipliers (45, 47) are amplified in order to drive a torquer (25).

12 Claims, 2 Drawing Sheets

ELECTRONIC TORQUER INTERFACE AND ERECTION CONTROL CIRCUIT

FIELD OF THE INVENTION

This invention relates to electronic motor control circuits and to gyroscope erection systems which have tilt sensors. More specifically, the invention relates to a circuit which generates signals for powering tilt transducers in a gyroscope gimbal assembly, processes a resultant tilt angle signal, generates a power control signal for gyroscope torquer motors and provides a power output to the torquer motors.

BACKGROUND OF THE INVENTION

Gyroscope systems often incorporate level sensors for maintaining an inertial reference member (stable reference platform gimbal) level and stable about its roll and elevation axes with a high degree of accuracy. Such level sensors use electrolytic switches which are accurately mounted in relation to the stable reference platform gimbal.

A level sensor including an electrolytic switch is desirable for the purposes described since this type switch has a high sensitivity, is low in cost, and is highly reliable due to an absence of moving parts. One such gravity type switch is referred to in the art as a "bubble switch". Although the electrolytic switch is capable of maintaining almost constant null voltage under steady state temperature conditions, it is sensitive to ambient temperature conditions.

As is well known in the gyroscope art, to precess the spin axis of the gyroscope about one axis, a torque must be applied at an axis at perpendicular angle to the first axis. Thus, for example, to maintain the spin axis of a directional gyroscope in a horizontal position, a torque is applied about the vertical axis. Conventional practice has been to mount liquid level switches on the various gimbal rings to sense the tilting of the gimbal from a desired position and energize a corresponding precessing device (motor) to return the gimbal to the desired position.

In conventional liquid level switches, a fluid electrolyte moves from one position in the switch to another as the gimbal is tilted. For example, if such a switch be mounted on the normally horizontal gimbal of a direction gyroscope, a tilting about the horizon causes the switch to tilt and operate a precessing device to apply a torque about the vertical axis to restore the gimbal ring to a level horizontal position.

Demand for rapid arming of unmanned flight vehicles (missiles and drones) has created a need for fast initial erection rates for vertical gyros. Limited battery power has imposed stringent power requirements and the need for a DC power torquer system. DC torquer components are bulky and costly as compared to AC torquer systems, but it is much more difficult to exercise precise control over an AC system than it is over a DC system.

Electronic systems have previously been applied to control gyroscope erection systems. One prior art gyroscope erection system uses a control circuit to cut out the erection system during rapid attitude changes. This system is described in U.S. Pat. No. 3,203,261.

It is therefore desired to use electronics to create a vertical gyro erection system that uses a DC power supply, generates fast erection rates, has high performance gyro accuracy, and uses simple AC torquer motor components.

SUMMARY OF THE INVENTION

In accordance with the present invention, outputs of an electrolytic tilt transducer are fed to a demodulator which, in turn, provides signal outputs proportional to a tilt error, as measured by the tilt transducer. The signal outputs are amplified by a power circuit which is used to control an AC torquer motor. By the use of a demodulation circuit, current through the electrolytic tilt transducers is minimized and the circuit torquer motor is provided with power in a more efficient manner.

A gyroscope erection system according to this invention includes a high performance vertical sensing system which uses a vertical sensor as a signal source only, increases torquing rate and increases torquer drive efficiency.

Using the sensor as a signal source only reduces the verticality tolerance two ways. First, delivering power to the torquers directly through the vertical sensor causes self heating of the sensors. Testing has shown that the characteristics of the sensor are degraded at elevated temperatures. The low currents required when the sensor is used only to generate an error signal do not induce these deleterious temperature effects. Second, the tolerance in sensor scale factor can be compensated for by calibrating the gain of the error amplifier. Since the slope of the input angle vs. output voltage varies from sensor to sensor, repeatability of the verticality in a production lot of gyros varies accordingly. Our design employs an error amplifier which can be calibrated to yield consistent gyro verticality.

The level sensor will be removed from the torquer drive circuit, and instead will be used solely to detect verticality errors. The level sensor will trigger a control circuit which in turn outputs an error signal. This error signal will be amplified to drive the gimbal torquer, thereby increasing the torquing rate.

Removing the level sensor from the torquer drive circuit eliminates the 30 milliampere limit customarily applied to torquer current. This is advantageous when the gyro is in a fast erection mode at power-on. In this situation, the gyro may be required to achieve verticality from an initial error condition as great as 180°. Whereas typical vertical gyro specifications allow as much as 5 minutes to achieve initial verticality, preliminary tests indicate an initial erection time of 30 seconds may be achieved with increased torque drive. As a result, warm up time for drone applications can be shortened accordingly.

The erection torque will be optimized by maintaining the phase difference between torquer windings at 90°. Typically, erection torque rate is controlled by varying the phase angle between the voltages applied to the two torquer motor windings. Since this angle varies between 0 and 55 degrees, efficiency, which is proportional to the sine of this angle, is at best 80%. Maintaining a constant 90° phase angle and controlling the torque rate by varying the torquer drive current yields a torquer drive design approaching 100% efficiency. This results in greater torque without ncreasing the torquer size. Also, input power is minimized when the gyro is vertical (no input error). This is in contrast to the phase control technique, which assumes maximum power at vertical.

DETAILED DESCRIPTION OF THE DRAWINGS

Figure 1:
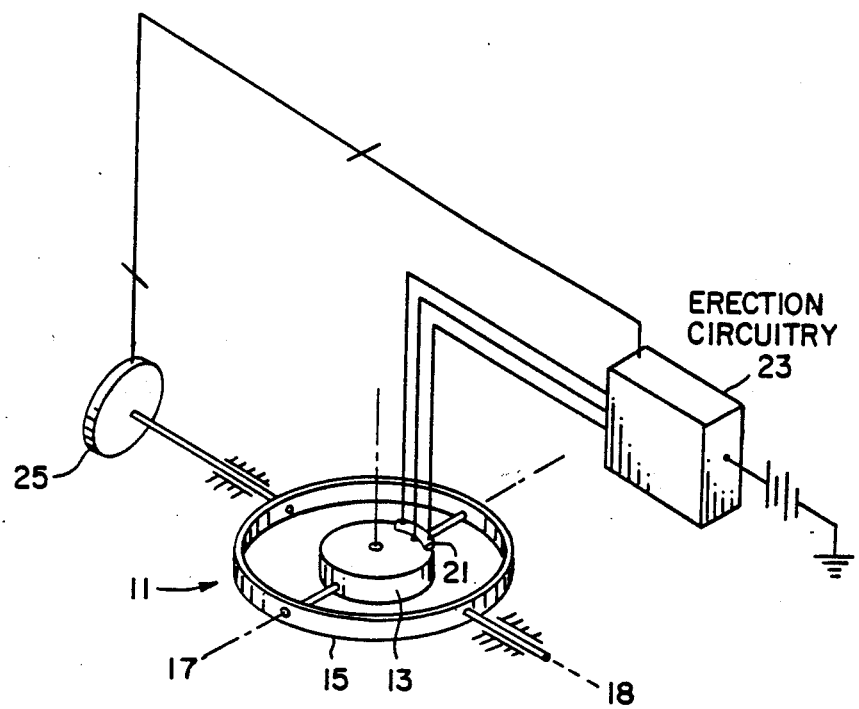
Figure 2:
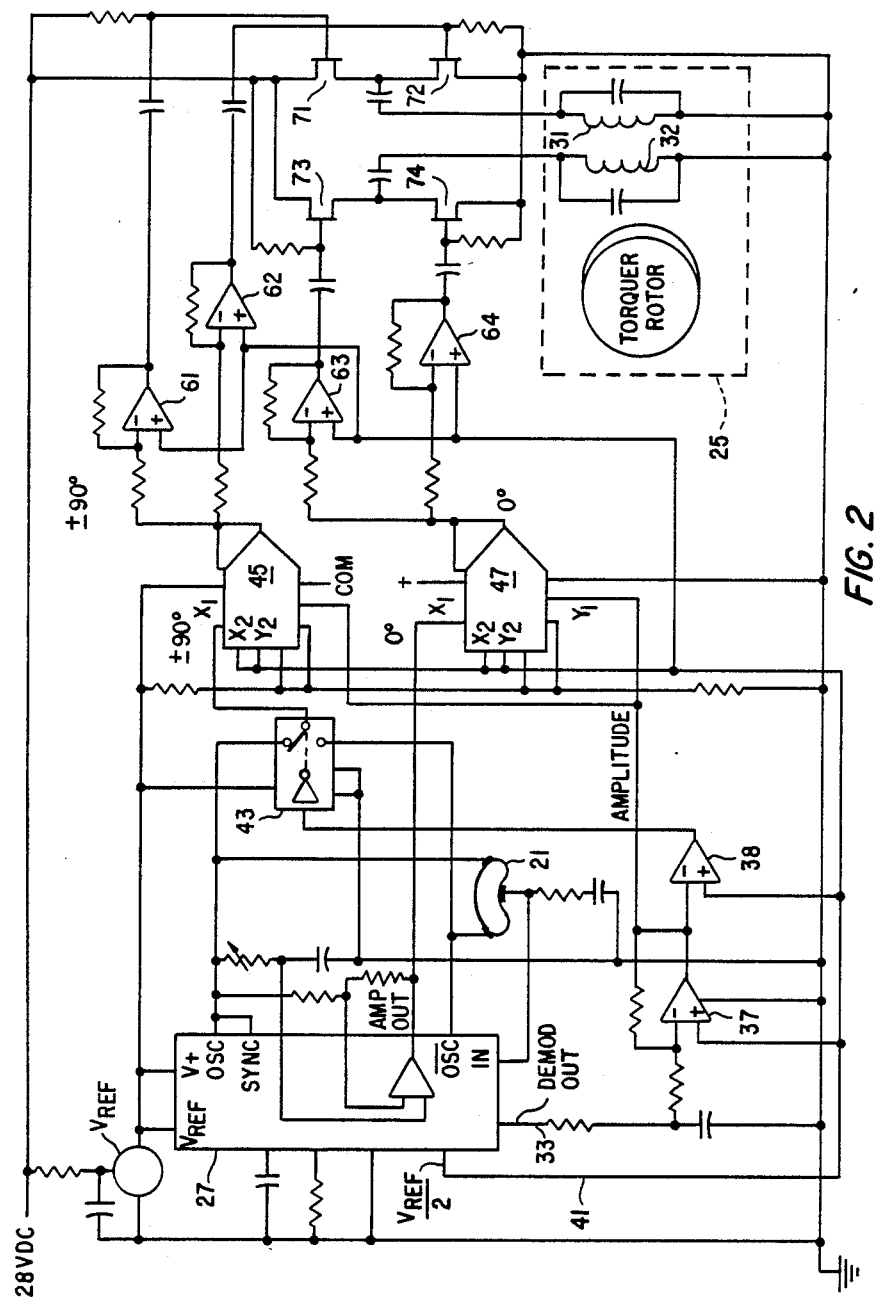

FIG. 1 shows a diagram of a gyroscope erection system using the components of the present invention; and FIG. 2 shows a gyroscope erection circuit constructed in accordance with a preferred embodiment of the invention.

DETAILED DESCRIPTION OF THE PREFERRED EMBODIMENT

FIG. 1 shows a symbolic representation of a gimballed gyroscope assembly, in which a gyroscope 13 is supported by a gimbal assembly 15. The gyroscope 13 is caused to precess about one or more axes 17, 18 in order to obtain various gyroscopic measurements. In some applications, it is necessary to set the gyroscope 13 at an initial level position, as sensed by a tilt transducer 21, which FIG. 1 shows as sensing tilt along axis 17.

The present invention uses a torquer motor, in order to rotate the gimbal assembly 15 by applying a torque about an axis, shown as axis 18, 90° from the sensed tilt axis. In the present invention, circuitry 23 responds to electrical states of a tilt transducer 21 in order to provide a compensating output to a torquer motor 25.

Referring to FIG. 2, the erection circuitry 23 includes a signal conditioning circuit 27 which provides input signals to the tilt transducer 21 and receives output signals from the tilt transducer. The signal conditioning circuit 27 demodulates these output signals from the tilt transducer 21 and, in response to the demodulated signals, provides an output which is used as error signals to generate control signals to be applied to torquer coils 31, 32. The torquer coils 31, 32 are a part of the torquer motor 25 and function as stator windings for the torquer motor 25.

With reference to FIG. 2, the signal conditioning circuit 27 provides a demodulated output signal along line 33. The demodulated output signal is amplified by an error signal amplifier 37, which provides as its output a tilt error signal. Error signal amplifier 37 provides signals relating to magnitude of tilt. Differential amplifier 38 provides signals relating to direction of tilt of the tilt transducer 21 by comparing the error signal from amplifier 37 with a halved reference voltage signal provided by the signal conditioning circuit 27 along line 41. This direction signal is provided from difference amplifier 38 to an electronic switching element 43 which, in the preferred embodiment, is a CMOS SPDT switch.

A pair of multipliers 45, 47 receive the demodulated output signal from the signal conditioning circuit 27 and provide sinusoidal output signals at 90° apart from each other. In the embodiment shown, multiplier 45 provides its signal at a peak phase of ±90° from 0 and multiplier 47 provides its output at 0°. The switching element 43 controls the lead or lag (90°) of the output of multiplier 45 in accordance with the direction sensed by amplifiers 37, 38 comparing a half-reference voltage signal with the demodulated output signal. The switching element 43 switches its output between oscillator OSC and inverted oscillator $\overline{OSC}$ output signals from the signal conditioning circuit 27 in accordance with its switching control signals from amplifier 38. The signal conditioning circuit 27 includes an amplifier which is used as a phase shifting circuit in order to provide a phase shifted amplifier output which is phase shifted by 90° to be midway between the oscillator and the inverted oscillator outputs OSC and $\overline{OSC}$. This phase shifted output is used as a 0° phase signal in order to provide a 0° phase signal to multiplier 47.

The oscillator OSC and inverted oscillator $\overline{OSC}$ outputs, in addition to being provided to switching element 43, are used as input signals to the tilt transducer 21, thereby resulting in the output from the tilt transducer, which is provided to the signal conditioning circuit 27, reflecting direction of tilt in synchronization with the OSC and $\overline{OSC}$ outputs.

The multiplying circuits 45, 47 are used to provide outputs to a series of amplifiers 61–64, which are used to gate a series of FETs 71–74. The FETs 71–74 are in pairs forming a push/pull configuration. The FETs 71–74 provide their outputs to the torquer coils 31, 32. In the preferred embodiment, the multipliers 45, 47 control the output of the control bridge by varying the current amplitude admitted through the FETs 71–74. It is also possible to use other power control techniques such as pulse width modulation and phase shift control.

In operation, when the tilt transducer 21 is tilted in one direction or the other, one side of the tilt transducer exhibits a lower impedance, thereby increasing the magnitude of either the oscillator OSC or inverted oscillator $\overline{OSC}$ signal as its output provided to the signal conditioning circuit 27. The signal conditioning circuit 27 then demodulates that output in accordance with its relationship between the oscillator OSC or inverted oscillator $\overline{OSC}$ signal. The amplitude of the demodulated output is applied equally to both multiplying circuits 45, 47. The switching circuit is controlled for instance through amplifiers 37, 38 by the direction of tilt in order that the output of multiplier 47 can be applied in a lead or lag mode with respect to the zero reference phase. Thus, torquers 31, 32 are energized in accordance with an amplitude and phase as indicated by the demodulated output provided from the signal conditioning circuit 27 at line 35.

In the preferred embodiment, the signal conditioning circuit is a model SE5521 signal conditioning circuit obtained from Signetics Corporation of Sunnyvale, Calif. The SE5521 contains three main circuits; a variable frequency oscillator, a demodulator and an uncommitted amplifier. The oscillator generates a stable sine wave and provides the uninverted and inverted outputs OSC and $\overline{OSC}$. $\overline{OSC}$ is 180° out of phase with OSC. The oscillator also drives a comparator in the SE5521. The comparator is used as part of a demodulator. In order that the demodulator may compare the oscillator signal with a half-reference voltage signal, the demodulator extracts phase and amplitude information, which in this case, is the output of the tilt transducer 21.

As can be seen, the tilt transducer 21 actually provides its output from a common terminal, rather than from its two end terminals. Therefore, the ability to demodulate the output of the tilt transducer 21 depends upon the demodulator in the signal conditioning circuit 27 being able to sense the relative phases of the signals being provided to the end terminals of the tilt transducer 21. The oscillator's simultaneous driving of the demodulator's comparator and the tilt transducer's end terminals results in the demodulated output signal at line 35 having a directional component. This directional component is the phase of the demodulated input signal with respect to the oscillator OSC signal. The directional component of the domodulator output is the DC voltage amplitude in reference to half-reference voltage ($V_{ref}/2$, shown as line 41 in FIG. 2). Above this level $V_{ref}/2$ is one direction, below $V_{ref}/2$ is the opposite direction.

The switching element 43 is preferably an AD7512DI dual SPDT switch, available from Analog Devices of Norwood, Me.

The multipliers 45, 47 are preferably AD532 multipliers, available from Analog Devices of Norwood, Me.

We claim:

1. Level control arrangement which includes a torquer motor and a tilt transducer, characterized by:
   (a) means to provide the tilt transducer with a first signal and a second signal, the second signal being an oscillator signal;
   (b) the tilt transducer providing a level output signal, in which the relative influence of the first and second signals is dependent upon a level condition sensed by the tilt transducer;
   (c) means responsive to the oscillator signal and the level output signal, to demodulate the output of the tilt transducer, and said means responsive to the oscillator signal including a comparator for comparing signal levels of the level output signal and at least one of the first and second signals; and
   (d) means responsive to the demodulated output of the tilt transducer to control the torquer motor in response to the demodulated output and the oscillator signal, and said means responsive to the demodulated output being responsive to a voltage level and further providing an output to the torquer motor in which the output has a directional component which is dependent upon the magnitude of the voltage level.

2. Level control arrangement as described in claim 1, further characterized by:
   the means responsive to the demodulated output including means for controlling the amount of energy applied to the torquer motor.

3. Level control arrangement as described in claim 1, further characterized by:
   the means responsive to the demodulated output including a multiplier for controlling the amount of energy applied to the torquer motor; and
   the multiplier providing an output signal which changes amplitude according to the amount of energy to be applied to the torquer motor.

4. Level control arrangement as described in claim 1, further characterized by:
   the means responsive to the oscillator signal and the level output signal including switching means responsive to a relative phase shift between the output signal and at least one of the first and second signals, and further providing as output to the torquer motor, in which the output has a directional component corresponding to the phase shift.

5. Level control arrangement as described in claim 4, further characterized by:
   the means responsive to the oscillator and the level output including switching means for selecting a phase of a signal for said control of the torquer motor.

6. Level control arrangement as described in claim 1, further characterized by:
   the means to control the torquer motor including a drive circuit which applies current at a phase angle of approximately 90° and which controls torque by varying an amount of current applied to the torquer motor.

7. Level control arrangement as described in claim 6, further characterized by:
   the drive circuit controlling torque by current amplitude control.

8. Gyroscope system which includes a torquer motor and a tilt transducer, characterized by:
   (a) the tilt transducer providing a level output signal which is dependent upon a level condition sensed by the tilt transducer;
   (b) means responsive to the level output signal, to demodulate the output of the tilt transducer, and said means responsive to the level output signal including a comparator for comparing signal levels of the level output signal and at least one additional signal; and
   (c) means responsive to the demodulated output of the tilt transducer to control the torquer motor in response to the demodulated output and the oscillator signal, and said means responsive to the demodulated output being responsive to a voltage level and further providing an output to the torquer motor in which the output has a directional component which is dependent upon the magnitude of the voltage level.

9. Gyroscope system as described in claim 8, further characterized by:
   the means responsive to the demodulated output including means for controlling the amount of energy applied to the torquer motor.

10. Gyroscope system as described in claim 8, further characterized by:
    the means responsive to the demodulated output including a multiplier for controlling the amount of energy applied to the torquer motor; and
    the multiplier providing an output signal which changes amplitude according to the amount of energy to be applied to the torquer motor.

11. Gyroscope system as described in claim 8, further characterized by:
    the means to control the torquer motor including a drive circuit which applies current at a phase angle of approximately 90° and which controls torque by varying an amount of current applied to the torquer motor.

12. Gyroscope system as described in claim 11, further characterized by:
    the drive circuit controlling torque by current amplitude control.

* * * * *